United States Patent
Zhao et al.

(10) Patent No.: US 9,179,381 B2
(45) Date of Patent: Nov. 3, 2015

(54) REDUCING NETWORK-INITIATED QOS INTERRUPTION TIME WHEN RADIO AND CORE NETWORKS ARE OUT OF SYNCHRONIZATION DUE TO DIFFERENT UNDERLYING TECHNOLOGIES

(75) Inventors: Suli Zhao, San Diego, CA (US); Ajith Tom Payyappilly, San Diego, CA (US); Srinivasan Balasubramanian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 508 days.

(21) Appl. No.: 13/249,125

(22) Filed: Sep. 29, 2011

(65) Prior Publication Data

US 2013/0083771 A1    Apr. 4, 2013

(51) Int. Cl.
  *H04W 4/00* (2009.01)
  *H04W 36/14* (2009.01)
  *H04W 36/00* (2009.01)

(52) U.S. Cl.
  CPC ............ *H04W 36/14* (2013.01); *H04W 36/005* (2013.01)

(58) Field of Classification Search
  USPC .................................................. 370/310–350
  See application file for complete search history.

(56) References Cited

U.S. PATENT DOCUMENTS

| 7,167,447 | B2 | 1/2007 | Puuskari et al. |
| 7,185,070 | B2 | 2/2007 | Paul et al. |
| 7,382,750 | B2 * | 6/2008 | Wu ................................ 370/331 |
| 7,693,520 | B2 * | 4/2010 | Kang et al. ...................... 455/436 |
| 7,830,804 | B2 | 11/2010 | Kavanaugh et al. |
| 8,289,861 | B2 | 10/2012 | Zafer et al. |
| 2003/0050070 | A1 | 3/2003 | Mashinsky et al. |
| 2003/0214922 | A1 * | 11/2003 | Shahrier ........................ 370/331 |
| 2006/0052137 | A1 | 3/2006 | Randall et al. |
| 2007/0032235 | A1 | 2/2007 | Wahl et al. |

(Continued)

FOREIGN PATENT DOCUMENTS

| EP | 1978685 A1 | 10/2008 |
| GB | 2386282 | 9/2003 |

(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP Standard; 3GPP TS 23.401, 3rd Generation Partnership Project (3GPP), Mobile Competence Centre ; 650, Route Deslucioles ; F-06921 Sophia-Anti Poliscedex ; France, No. V10.1.0, Sep. 29, 2010, pp. 1-271, XP050442333, [retrieved on Sep. 29, 2010].

(Continued)

*Primary Examiner* — Kwang B Yao
*Assistant Examiner* — Juvena Loo
(74) *Attorney, Agent, or Firm* — Seyfarth Shaw LLP

(57) ABSTRACT

A method enables a user equipment (UE) intervention to reduce a network-initiated Quality of Service (QoS) interruption time or a disruption of the network-initiated QoS, while avoiding application intervention. The method includes communicating with a source radio access network (RAN) in accordance with a network-initiated quality of service (QoS) profile. The method also includes transferring to a target RAN. The method further includes triggering, by a user equipment (UE), a QoS setup to reestablish the QoS profile.

12 Claims, 15 Drawing Sheets

(56) References Cited

U.S. PATENT DOCUMENTS

| | | | |
|---|---|---|---|
| 2007/0091849 A1* | 4/2007 | Park et al. | 370/331 |
| 2007/0160045 A1 | 7/2007 | Payyappilly et al. | |
| 2007/0258407 A1* | 11/2007 | Li et al. | 370/331 |
| 2007/0286117 A1 | 12/2007 | Balasubramanian et al. | |
| 2009/0040983 A1* | 2/2009 | Kim et al. | 370/331 |
| 2009/0122763 A1* | 5/2009 | Oguchi | 370/331 |
| 2009/0185527 A1 | 7/2009 | Akhtar et al. | |
| 2009/0285225 A1 | 11/2009 | Dahod | |
| 2010/0070637 A1 | 3/2010 | Saito et al. | |
| 2010/0074109 A1 | 3/2010 | Klingenbrunn et al. | |
| 2010/0115072 A1 | 5/2010 | Payyappilly et al. | |
| 2010/0135253 A1 | 6/2010 | Lee et al. | |
| 2010/0195503 A1 | 8/2010 | Raleigh | |
| 2011/0170453 A1 | 7/2011 | Babbar | |
| 2011/0255507 A1* | 10/2011 | Gomez Velez et al. | 370/331 |
| 2012/0008573 A1* | 1/2012 | Shiva et al. | 370/329 |
| 2012/0069763 A1 | 3/2012 | Zhao et al. | |
| 2012/0198081 A1 | 8/2012 | Zhao et al. | |
| 2012/0201144 A1 | 8/2012 | Cormier et al. | |

FOREIGN PATENT DOCUMENTS

| | | |
|---|---|---|
| GB | 2466225 A | 6/2010 |
| JP | 2010068406 A | 3/2010 |
| KR | 20050025077 A | 3/2005 |
| KR | 20090005366 A | 1/2009 |
| KR | 20090015826 A | 2/2009 |
| WO | 07112325 A1 | 10/2007 |
| WO | 2007117724 A2 | 10/2007 |

OTHER PUBLICATIONS

Ericsson: "Operator Controlled QoS", 3GPP TSG SA WG2, XX, XX, vol.SA2#50, No. S2-060049, Jan. 16, 2006, p. 5pp, XP007901697.

International Search Report and Written Opinion—PCT/US2012/057351—ISA/EPO—Jan. 3, 2013.

Qualcomm Europe: "QoS handing during inter BBERF handoff", 3GPP Draft; S2-087482,3rd Generation Partnership Project (3GPP), Mobile Competence Centre ; 650, Route Deslucioles ; F-06921 Sophia-Anti Poliscedex ; France, No. Miami; Nov. 12, 2008, XP050331939, [retrieved on Nov. 12, 2008].

Rajeev Koodli Charles E Perkins Communication Systems Laboratory Nokia Research Center: "A Context Transfer Protocol for Seamless Mobility draft-koodli-seamoby-ct-04.txt; draft-koodli-seamoby-ct-04.txt", Aug. 30, 2008, No. 4, Aug. 30, 2002, XP015004020, ISSN: 0000-0004.

3GPP2 A.S0007, "1xEV-DO Inter-Operability Specification (IOS) for CDMA 2000 Access Network Interfaces", SP-3-0009 (TIA/EIA/IS-878) 1xEV-DO IOS Ballot Version, Jun. 14, 2001, 118 Pages.

Dolan M., et al., 3GPP2 X.S0057-0 v2.0—Reorganization of sections 13 and 14, X50-20090603-001r0, Jun. 18, 2009, pp. 1-27.

QUALCOMM: 3GPP2 inter-HSGW handoff procedures, Feb. 16, 2009, pp. 1-6.

Wang J., et al., "The cdma2000 QoS as developed in TSG-X", Jul. 17, 2006, pp. 1-24, ftp://ftp.3gpp2.org/TSGA/Working/2004/0920-Clearwater/TSG-A+C+X%20QoS/X00-20040920-024-QoS%20presentation.pdf.

* cited by examiner

REDUCING NETWORK-INITIATED QOS INTERRUPTION TIME WHEN RADIO AND CORE NETWORKS ARE OUT OF SYNCHRONIZATION DUE TO DIFFERENT UNDERLYING TECHNOLOGIES

BACKGROUND

1. Field

Aspects of the present disclosure relate generally to wireless communication systems, and more particularly to reducing a network-initiated QoS interruption time or a disruption of network-initiated QoS when radio and core networks are out of synchronization due to different underlying technologies, while avoiding application intervention.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to one aspect of the present disclosure, a method enables a user equipment (UE) intervention for reducing a network-initiated Quality of Service (QoS) interruption time or a disruption of the network-initiated QoS, while avoiding application intervention. The method includes communicating with a source radio access network (RAN) in accordance with a network-initiated quality of service (QoS) profile. The method further includes transferring to a target RAN. The method also includes triggering, by a user equipment (UE), a QoS setup to reestablish the QoS profile.

In another aspect, an apparatus for a UE intervention for reducing a network-initiated QoS interruption time or a disruption of the network-initiated QoS is described. The apparatus includes at least one processor; and a memory coupled to the at least one processor. The processor(s) is configured to communicate with a source radio access network (RAN) in accordance with a network-initiated quality of service (QoS) profile. The processor(s) is also configured to transfer to a target RAN. The processor(s) is further configured to trigger, by a user equipment (UE), a QoS setup to reestablish the QoS profile.

In a further aspect, a computer program product enables a UE intervention to reduce a network-initiated QoS interruption time or a disruption of the network-initiated QoS. The computer program product includes a non-transitory computer-readable medium having program code recorded thereon. The computer program product has program code to communicate with a source radio access network (RAN) in accordance with a network-initiated quality of service (QoS) profile. The computer program product also includes program code to transfer to a target RAN. The computer program product further includes program code to trigger, by a user equipment (UE), a QoS setup to reestablish the QoS profile.

In another aspect, an apparatus for a UE intervention for reducing a network-initiated QoS interruption time or a disruption of the network-initiated QoS is described. The apparatus includes means for communicating with a source radio access network (RAN) in accordance with a network-initiated quality of service (QoS) profile. The apparatus also includes means for transferring to a target RAN. The apparatus further includes means for triggering, by a user equipment (UE), a QoS setup to reestablish the QoS profile.

According to a further aspect of the present disclosure, a method enables a UE intervention for reducing a network-initiated QoS interruption time or a disruption of the network-initiated QoS, while avoiding application intervention. The method includes communicating with a radio access network (RAN) in accordance with a network-initiated first quality of service (QoS) profile. The method further includes receiving an indication that the RAN does not support or cannot grant a second QoS profile. The method also includes triggering, by a user equipment (UE), a QoS setup to reestablish the first QoS profile.

In another aspect, an apparatus for a UE intervention for reducing a network-initiated QoS interruption time or a disruption of the network-initiated QoS is described. The apparatus includes at least one processor; and a memory coupled to the at least one processor. The processor(s) is configured to communicate with a radio access network (RAN) in accordance with a network-initiated first quality of service (QoS) profile. The processor(s) is also configured to receive an indication that the RAN does not support or cannot grant a second QoS profile. The processor(s) is further configured to trigger, by a user equipment (UE), a QoS setup to reestablish the first QoS profile.

In a further aspect, a computer program product enables a UE intervention to reduce a network-initiated QoS interruption time or a disruption of the network-initiated QoS. The computer program product includes a non-transitory computer-readable medium having program code recorded thereon. The computer program product has program code to communicate with a radio access network (RAN) in accordance with a network-initiated first quality of service (QoS) profile. The computer program product also includes program code to receive an indication that the RAN does not support or cannot grant a second QoS profile. The computer program product further includes program code to trigger, by a user equipment (UE), a QoS setup to reestablish the first QoS profile.

In another aspect, an apparatus for a UE intervention for reducing a network-initiated QoS interruption time or a disruption of the network-initiated QoS is described. The apparatus includes means for communicating with a radio access network (RAN) in accordance with a network-initiated first quality of service (QoS) profile. The apparatus also includes means for receiving an indication that the RAN does not support or cannot grant a second QoS profile. The apparatus further includes means for triggering, by a user equipment (UE), a QoS setup to reestablish the first QoS profile.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
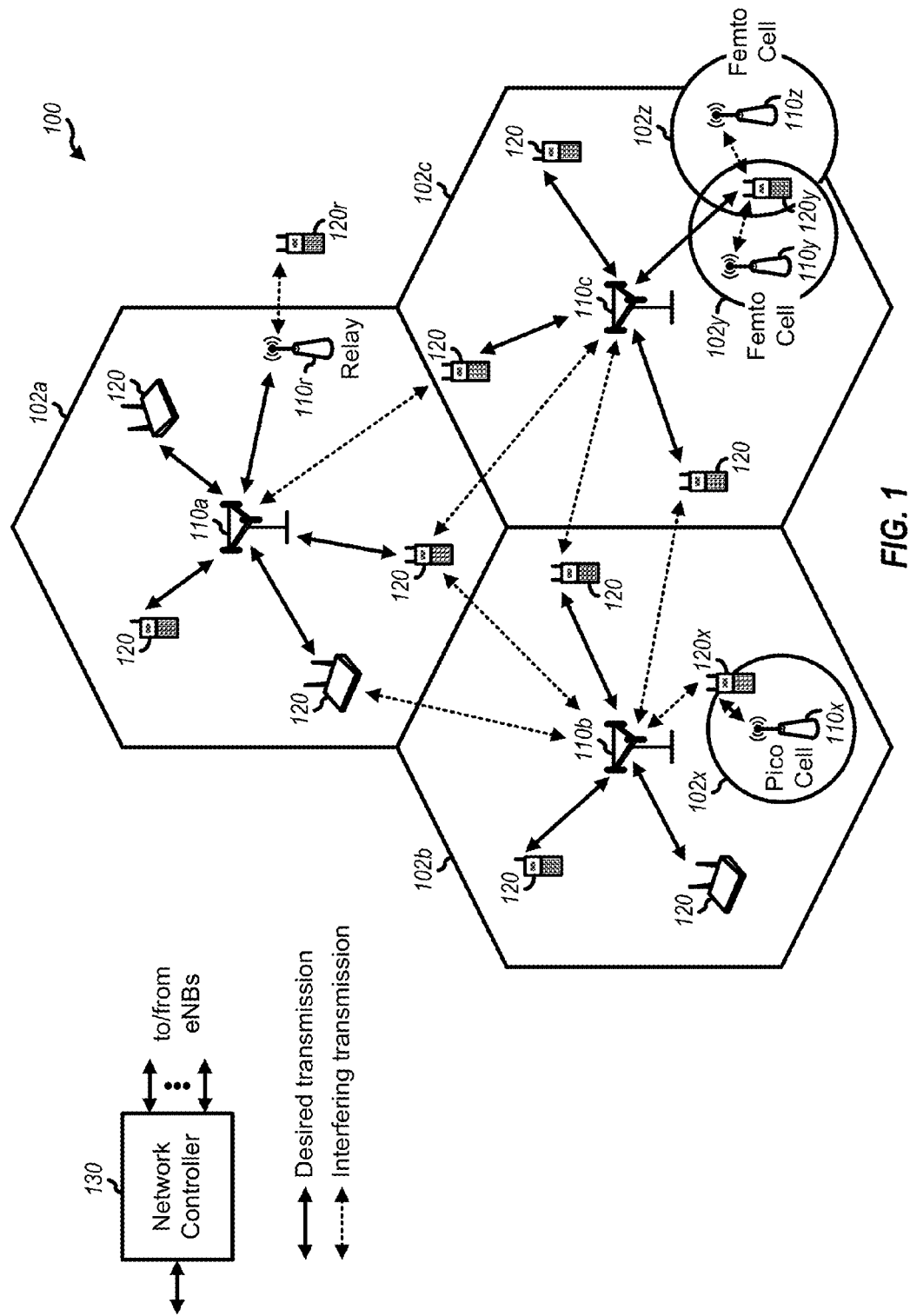
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS).

3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

The 3GPP2 organization first introduced a High Rate Packet Data (HRPD) system that used various advanced optimization techniques for data traffic. The advanced techniques used by the HRPD system included channel sensitive scheduling, fast link adaptation, Hybrid Automatic Repeat reQuest (HARQ), and the like. The HRPD system initially required a separate 1.25 megahertz (MHz) carrier and supported no voice service. As a result, HRDP was initially referred to as CDMA2000-EV-DO (evolution data only) system. Evolved HRDP (eHRPD) is an upgrade of the existing HRPD (EV-DO) networks. In particular, eHRPD allows EV-DO service providers to introduce System Architecture Evolution (SAE)/Evolved Packet Core (EPC) architecture elements to their existing packet core.

eHRPD networks may be referred to as hybrid networks for bridging the gap between HRPD networks and LTE networks. eHRPD networks are hybrid networks because the radio network is 3GPP2 (e.g., EV-DO RevA/RevB) and the core network is 3GPP (EPC). In HRPD, the philosophy was to limit support to UE-initiated QoS. Network-initiated QoS was not supported in standards as well as commercial deployments. With eHRPD, operators are planning to deploy network-initiated QoS to align with their LTE networks. Thus, support for network-initiated QoS has been introduced into the eHRPD standards.

In one aspect of the present disclosure, a user equipment (UE) intervention is described for reducing a network-initiated QoS interruption time or a disruption of network of initiated QoS without application intervention. An interruption (or disruption) of network-initiated QoS occurs when the radio network and the core networks are out of synchronization due to different underlying technologies. In particular, QoS that is authorized and provided by the core network may be interrupted in scenarios where the radio network could provide the QoS but does not because of lost synchronization regarding the core network's knowledge of the radio network's capabilities. In one configuration, the UE may intervene when the network-initiated QoS is lost or disrupted by initiating measures for resuming the network-initiated QoS.

In this configuration, the UE intervention reduces the period of time the UE application is left without QoS. Otherwise, the lost QoS may persist for the entire duration of the call or a service without UE intervention. The UE intervention resumes the network-initiated QoS when the UE moves to an area where the RAN supports the network-initiated QoS level. UE intervention may also be performed where an interface is unavailable for transferring the EV-DO session information when the UE moves between coverage areas of one RAN to another. UE intervention may also be performed when the core network attempts to modify the QoS parameters on the UE, but the RAN is unable to support the QoS at that time.

FIG. 1 shows a wireless communication network 100, which may be an LTE-A network, in which network-initiated QoS (Quality of Service) interruption time may be reduced. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
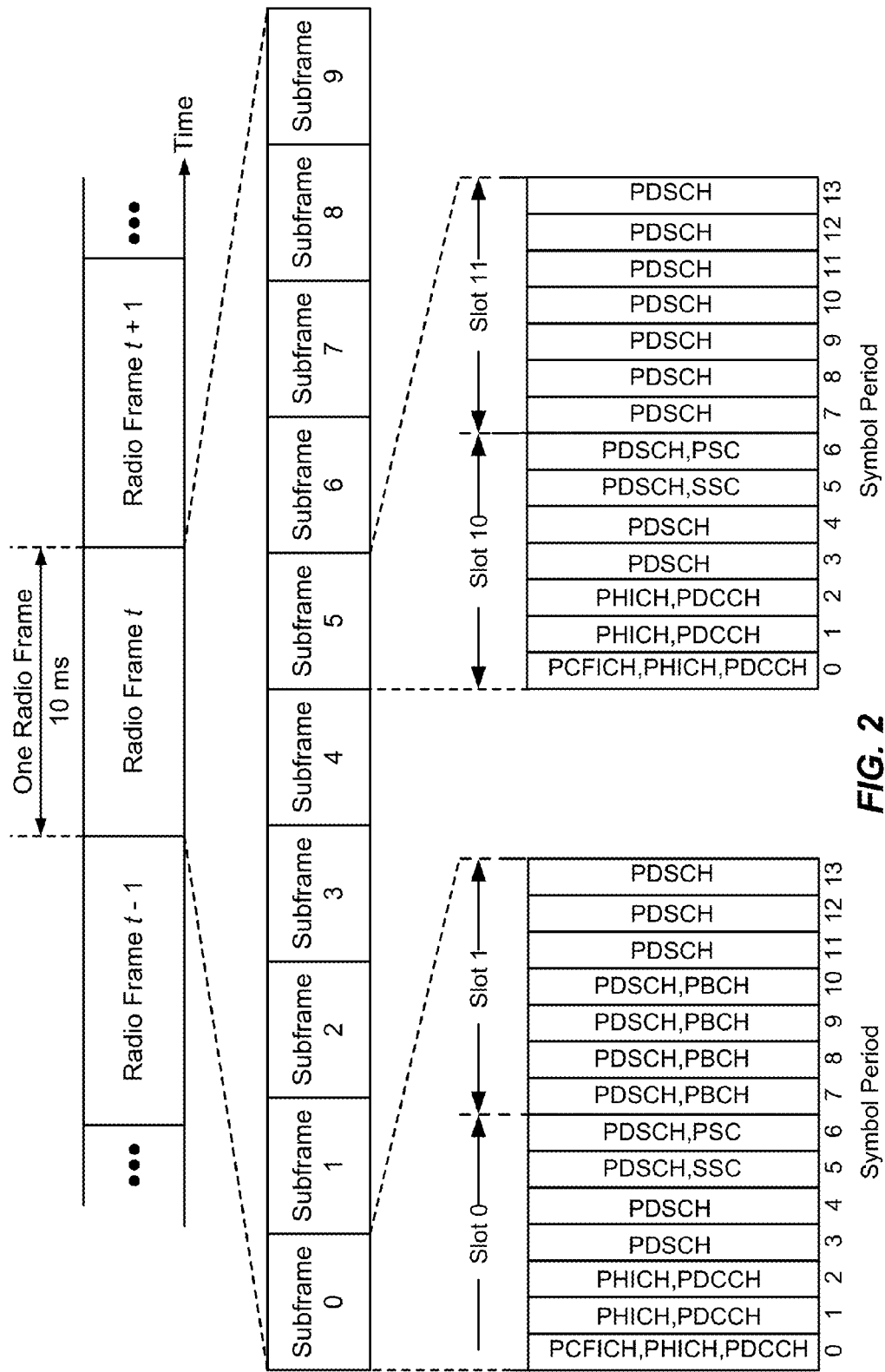
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
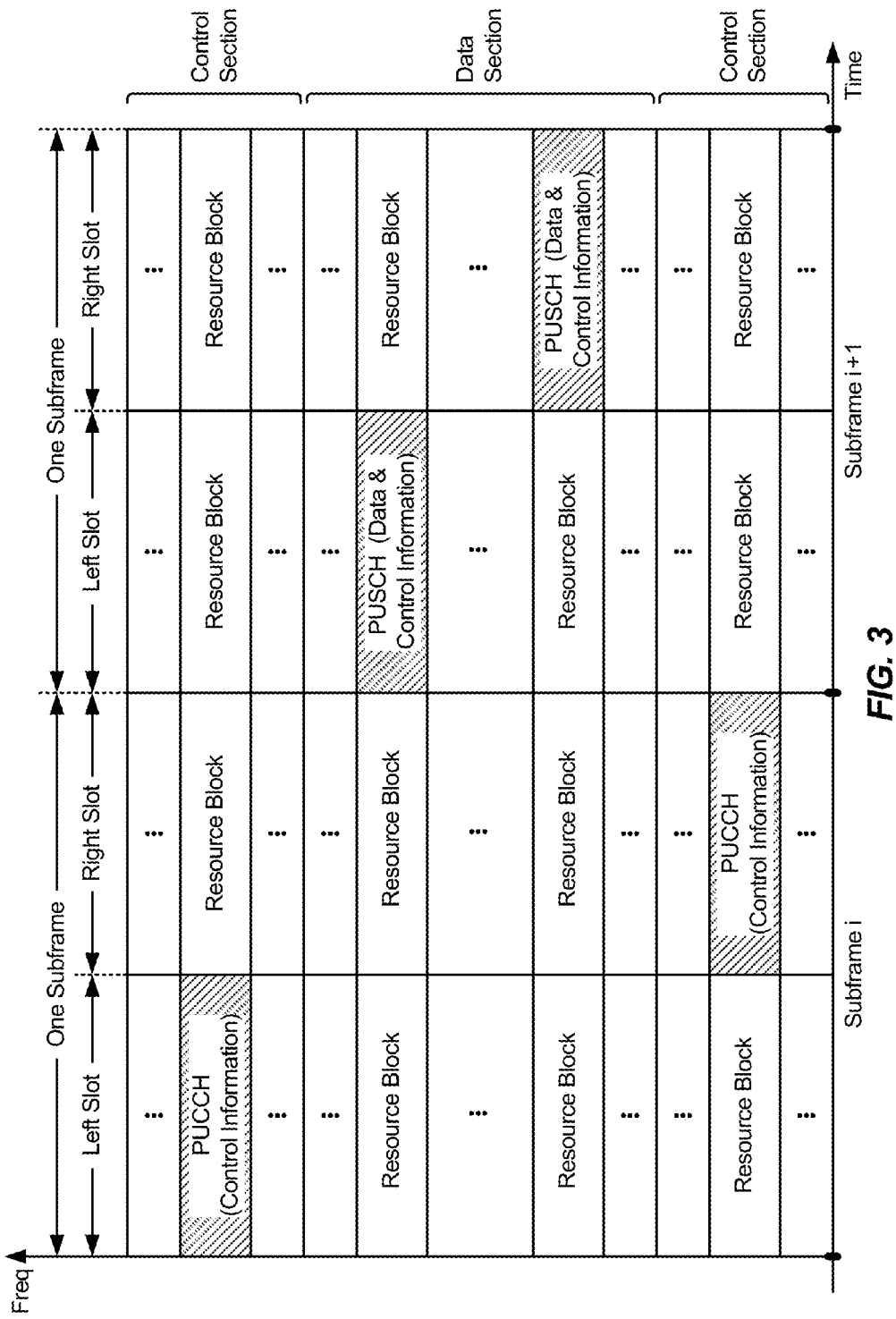
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
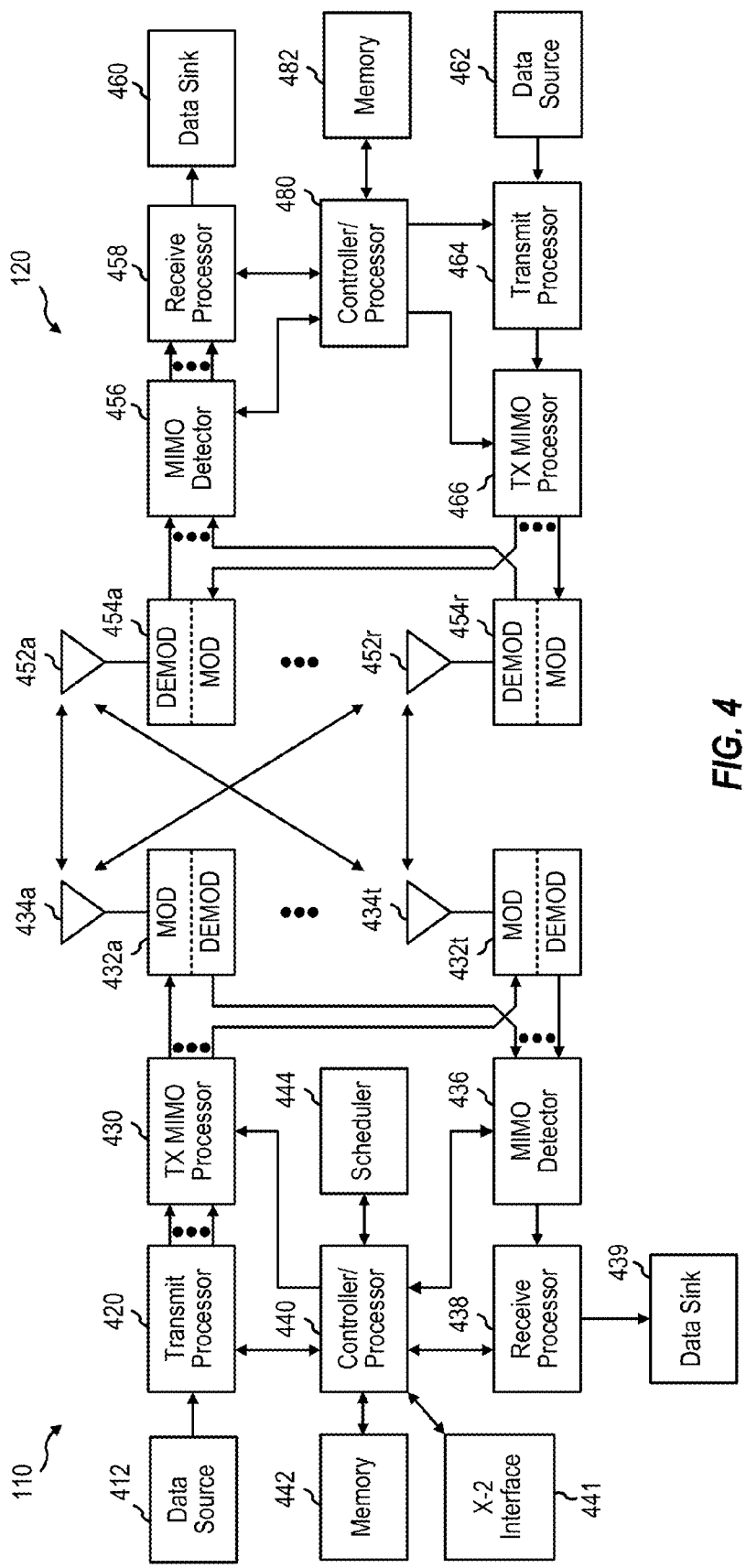
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIG. 15, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
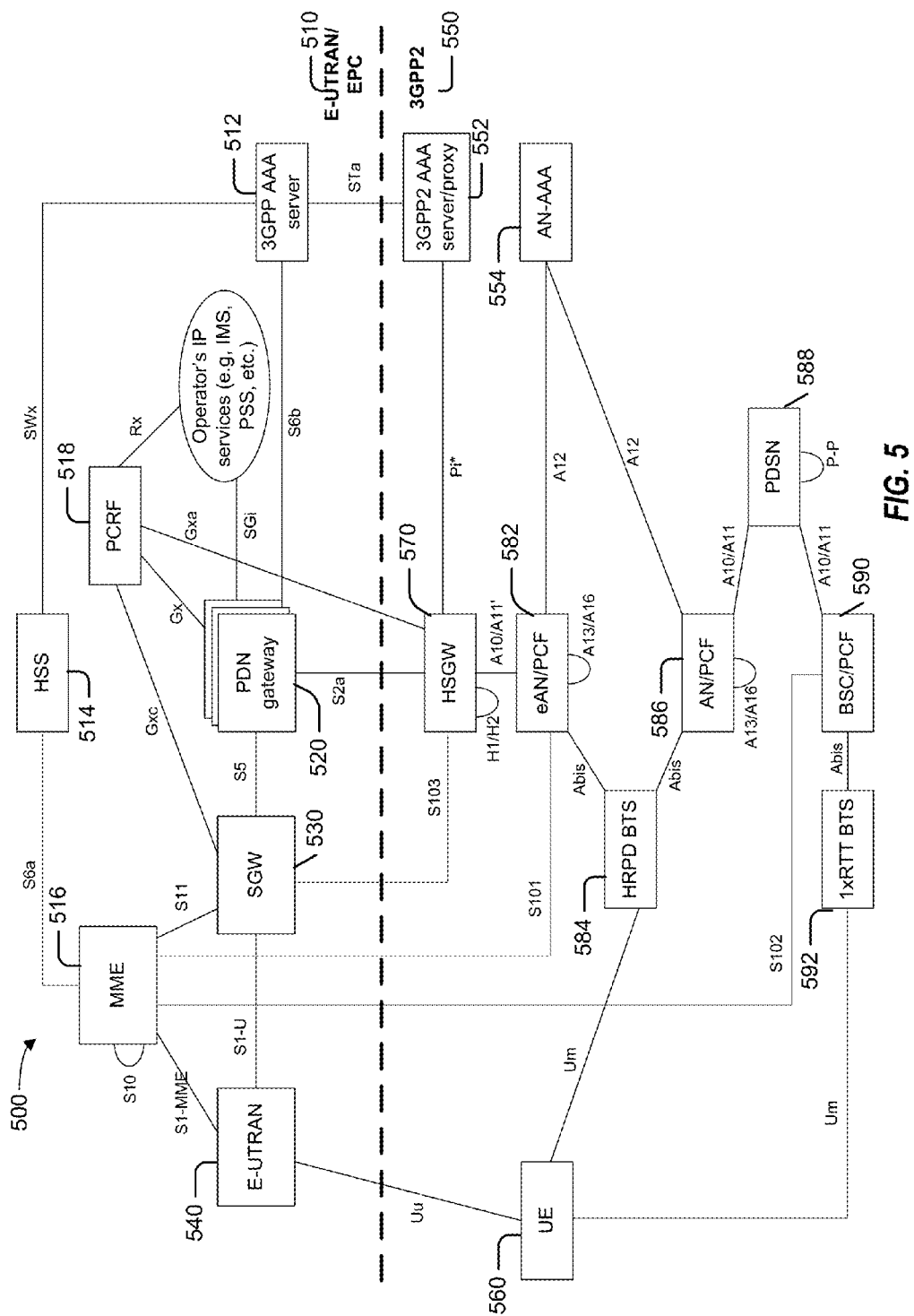
FIG. 5 is a block diagram illustrates an evolved High Rate Packet Data (HRPD) (eHRPD) network, according to one aspect of the present disclosure according to one aspect of the disclosure.

Reducing Network-Initiated QoS Interruption Time when Radio and Core Networks are Out of Synchronization Due to Different Underlying Technologies Evolved High Rate Packet Data (HRPD) (eHRPD) networks may be referred to as hybrid networks for bridging the gap between HRPD networks and LTE networks. FIG. 5 illustrates an eHRPD network 500, according to one aspect of the present disclosure. In this configuration, the eHRPD network 500 includes an evolved packet core (EPC) network 510 and a radio access network (RAN) 550. The RAN 550 includes an authentication, authorization and accounting (AAA) server/proxy 552, an access network (AN) AAA (AN-AAA) 554, an evolved AN/packet control function (PCF) (eAN/PCF) 582, an HRPD base transceiver station (BTS) 584, an access network packet control function AN/PCF 586, a packet data serving node (PDSN) 588, a base station controller (BSC)/PCF 590, and a 1× radio transmission technology (1×RTT) BTS 592.

Representatively, the eHRPD network 500 may be referred to as a hybrid network because the RAN 550 is in accordance with 3GPP2 (3rd Generation Partnership Project 2) and the EPC network 510 is in accordance with 3GPP (3rd Generation Partnership Project). In this configuration, a user equipment (UE) 560 operates with the 3GPP2 RAN 550 and the EPC network 510 according to an HRPD serving gateway (HSGW) 570 of the RAN 550 and a packet data network (PDN) gateway (PDN-GW) 520 of the EPC network 510. As further shown in FIG. 5, the EPC network 510 include a 3GPP AAA server 512, a serving gateway (SGW) 530, an evolved UMTS Terrestrial Radio Access Network (E-UTRAN) 540, a mobility management entity (MME) 516, a home subscriber server (HSS) 514, and a policy and changing rules function (PCRF) 518. It is noted that the different interface protocols, (such as S1-U) between the E-UTRAN 540 and the SGW 530) are merely exemplary. Other interfaces are also contemplated.

In HRPD, only UE-initiated QoS is supported. Network-initiated QoS was not previously supported in the standards or commercial deployments. For UE initiated QoS, the UE 560 is responsible for triggering procedures with the eHRPD network 500 to initiate and maintain a requested QoS level depending on the requirements of the applications running on the UE 560 at any point in time. Although the eHRPD network 500 ultimately decides what QoS level a particular UE 560 receives (based on the network load and available resources), the UE 560 is the driver that decides when to issue a network request for QoS.

For network-initiated QoS, it is assumed that the eHRPD network 500 is aware of when a UE 560 needs QoS based on information from the application servers and the other policy-determining entities on the eHRPD network 500. As a result, the eHRPD network 500 pushes QoS to the UE 560 when a determination is made to grant network-initiated QoS based on the network information. In response, the UE 560 does not respond in a proactive manner, but merely reacts to the procedures initiated by the eHRPD network 500.

Network-initiated QoS generally does not involve any intervention by the UE 560. The eHRPD network 500 simply pushes a QoS level to the UE 560 when the network resources are available for supporting a QoS level for the applications running on the UE 560. If the UE 560 moves to a part of the eHRPD network 500 where a particular level of QoS is not supported, the UE applications will not receive that QoS level. Subsequently, if the UE 560 moves to a portion of the network in which the QoS level is supported, the network should push the QoS level to the UE 560. Unfortunately, the EPC network 510 and the radio network (RAN) 550 may lose synchronization regarding whether the UE 560 is receiving the network-initiated QoS.

Lost synchronization between the EPC network 510 and the radio access network (RAN) 550 may occur within the eHRPD network 500 of FIG. 5. As indicated above, the eHRPD network 500 is a hybrid network, in which the RAN 550 is 3GPP2 and the EPC network 510 is 3GPP. This creates complications in scenarios where the UE 560 moves back and forth between areas of the eHRPD network 500 where the RAN capability to support a certain level of QoS is present and where it is absent. For example, the EPC network 510 may assume the UE 560 is receiving a network-initiated QoS; however, at the radio access network level, because the UE 560 moved from the source-RAN 550 to a target-RAN 580, the UE 560 does not receive the network-initiated QoS. In other words, due to communication deficiencies between the RAN 550 and the EPC network 510 of the eHRPD network 500, the EPC network 510 may be unaware that the RAN 550 is not providing QoS for a UE application that the EPC network 510 has authorized and is providing.

In one aspect, a UE intervention is described for reducing a network-initiated QoS interruption time or a disruption of the network-initiated QoS when the RAN 550 and the EPC network 510 are out of synchronization due to different underlying technologies, while avoiding application intervention. In particular, the UE 560 may intervene when the network-initiated QoS is lost by initiating measures for resuming the network-initiated QoS. The UE intervention reduces the period of time that the UE application is left without QoS, which may persist for the entire duration of a call or service resulting in a disruption of the network-initiated QoS without UE intervention. The UE intervention resumes the network-initiated QoS when the UE 560 moves to an area where the RAN 550 supports the network-initiated QoS level. UE intervention may also be performed where an interface (e.g., an A13 interface) is unavailable for transferring evolution data only (EV-DO) session information when the UE 560 moves between coverage areas of a source-RAN 550 to a target-RAN 580. UE intervention may also be performed where the EPC network 510 attempts to modify the QoS parameters on the UE 560, but the RAN 550 is unable to support the QoS at that time.

Figure 6:
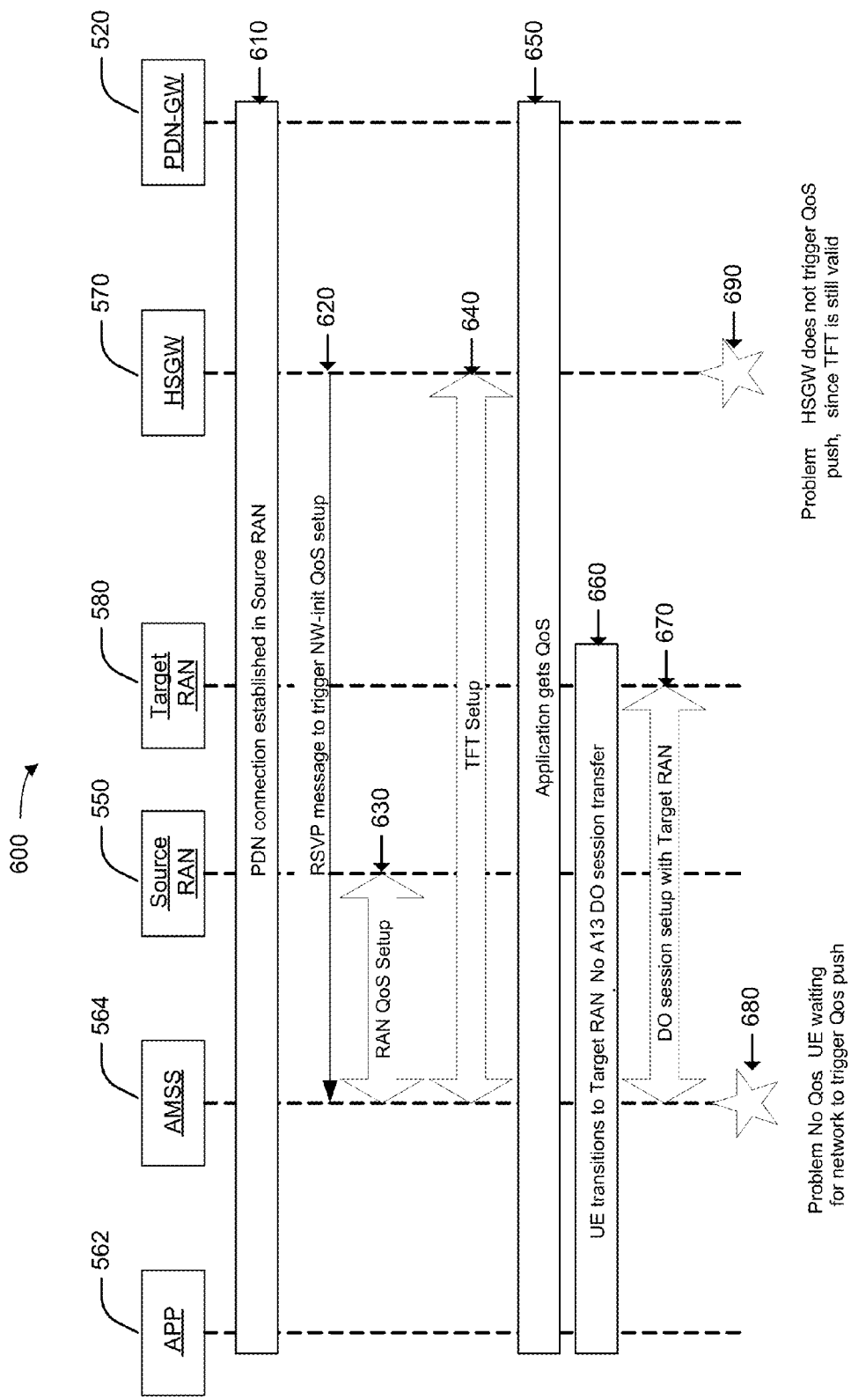
FIG. 6 is a call flow diagram illustrating an interruption of network-initiated Quality of Service (QoS) when radio and core networks are out of synchronization due to different underlying technologies.

FIG. 6 is a call flow diagram 600 illustrating an interruption of network-initiated QoS when radio and core networks are out of synchronization due to different underlying technologies. At time 610, a packet data network (PDN) connection for a user equipment (UE) 560 is established with the PDN-gateway (PDN-GW) 520 in the source radio access network (RAN) 550, for example, as shown in FIG. 5. A message (e.g., a resource reservation protocol (RSVP) message) may be issued by the HRDP Serving Gateway (HSGW) 570 at time 620 to, for example, an Advance Mobile Subscriber Software (AMSS) 564 on the UE 560 to trigger the setup of network-initiated Quality of Service (QoS). At time 630, a RAN QoS setup is performed at the source RAN 550. In addition, at time 640 a traffic flow template (TFT) may be setup by the HSGW 570 to provide the network-initiated QoS. Accordingly, at time 650 the network-initiated QoS is triggered from the HSGW 570, and the UE 560 has successfully setup radio-level and core network level QOS for the UE application 562.

As shown in FIG. 6, at time 660 the UE moves from the source-RAN 550 to a target-RAN 580; however, a failure to transfer the Evolution Data Only (EV-DO) information between the source-RAN 550 and the target RAN-580 occurs due to the absence of an interface (e.g., an A13 interface) between the source RAN 550 and the target-RAN 580. At time 670, the UE 560 sets up a new EV-DO session with the target-RAN 580. At time 680, the UE 560 remains in a passive mode regarding the network-initiated QoS because the UE 560 presumes that the eHRPD network 500 will trigger the UE 560 to setup the RAN QoS. In addition, at time 690, the HSGW 570 is unaware that the UE 560 is not receiving the network-initiated QoS. At time 690, the EPC network 510 and source-RAN 550 are out of synchronization and UE application 562 is not receiving the network-initiated QoS.

Figure 7:
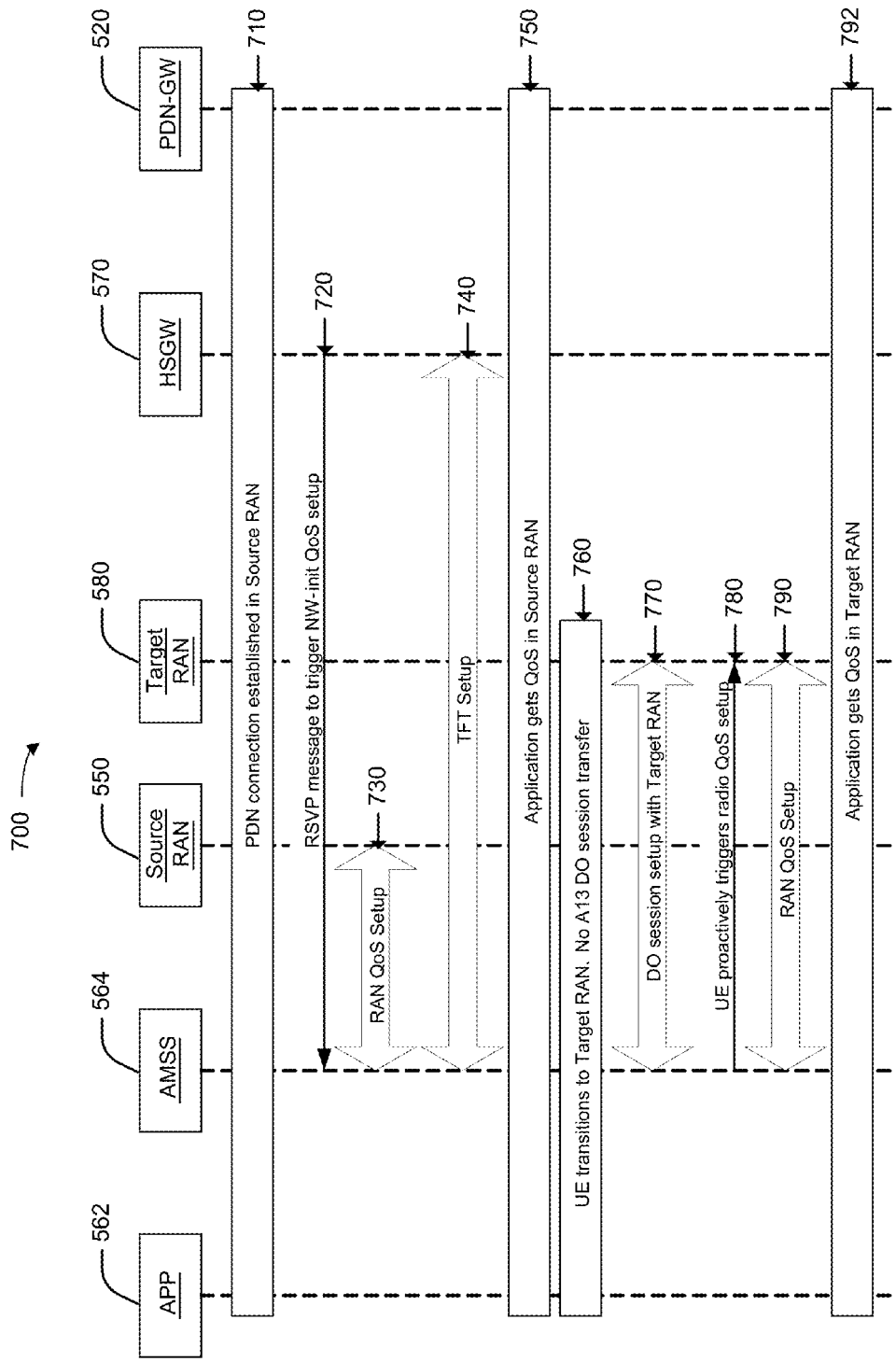
FIG. 7 is a call flow diagram illustrating a user equipment (UE) intervention for reducing a network-initiated Quality of Service (QoS) interruption time, according to one aspect of the present disclosure.

FIG. 7 is a call flow diagram 700 illustrating a UE intervention for reducing a network-initiated QoS interruption time, according to one aspect of the present disclosure. As shown in FIG. 7, the flows occurring at times 710 to 770 may correspond to the flows occurring at times 610 to 670 of FIG. 6. Accordingly, at time 750 the UE 560 has successfully setup radio-level and core network level QOS for the UE application 562. At time 760, the UE 560 moves from the source-RAN 550 to a target-RAN 580; however, a failure to transfer the EV-DO session information between the source RAN 550 and the target-RAN 580 occurs. At time 770, the UE 560 sets up a new EV-DO session with the target-RAN 580.

As shown in FIG. 7, at time 780 the UE 560 proactively sets up a radio QoS whenever the UE 560 moves to a different RAN. Representatively, the UE 560 proactively triggers a radio QoS setup with the target-RAN 580. At time 790, a RAN QoS setup is performed at the target-RAN 580 without waiting for a network-initiated trigger from the HSGW 570. At time 792, the UE application 562 receives the QoS assuming the radio QOS setup was successful at the target-RAN 580.

Figure 8:
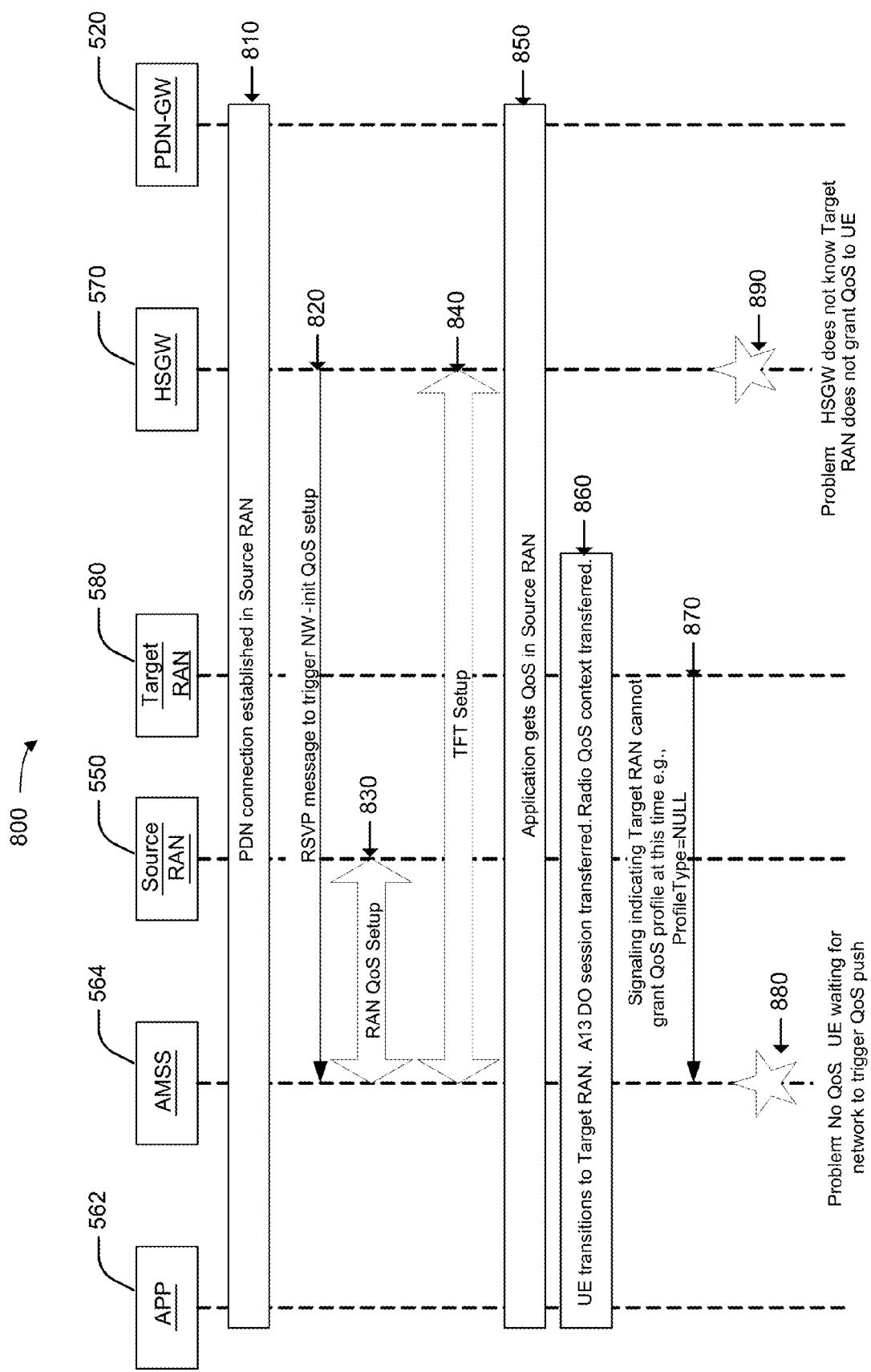
FIG. 8 is a call flow diagram illustrating an interruption of network-initiated Quality of Service (QoS) when radio and core networks are out of synchronization due to different underlying technologies.

FIG. 8 is a call flow diagram 800 illustrating an interruption of a network-initiated QoS when the radio network and the core network are out of synchronization due to different underlying technologies. As shown in FIG. 8, the flows occurring at times 810 to 850 may correspond to the flows occurring at times 710 to 750 of FIG. 7. Accordingly, at time 850, the UE 560 has successfully setup radio-level and core network level QoS and the UE application 562 is receiving QoS. At time 860, the UE 560 moves from the source-RAN 550 to a target-RAN 580 and an A13 interface is available to transfer the EV-DO session information between the RANs 550 and 580.

As shown in FIG. 8, a QoS context is transferred from the source RAN 550 to the target-RAN 580 using an A13 interface. At time 870, the target-RAN 580 is unable to grant the network-initiated QoS at that time. For example, the target-RAN 580 sends an AttributeUpdateRequest with ProfileType=NULL to indicate that the target-RAN 580 is unable to grant the QoS to UE 560. The failure to grant the network-initiated QoS may be temporary. At time 880, the UE 560 remains in a passive state regarding the network-initiated QoS because the UE 560 presumes that the eHRPD network 500 will trigger the UE 560 to setup a different QoS. At time 890, the HSGW 570 is unaware that the UE 560 is not receiving the QoS. As a result, the EPC network 510 and source-RAN 550 are out of synchronization, such that the UE application 562 do not receive QoS.

Figure 9:
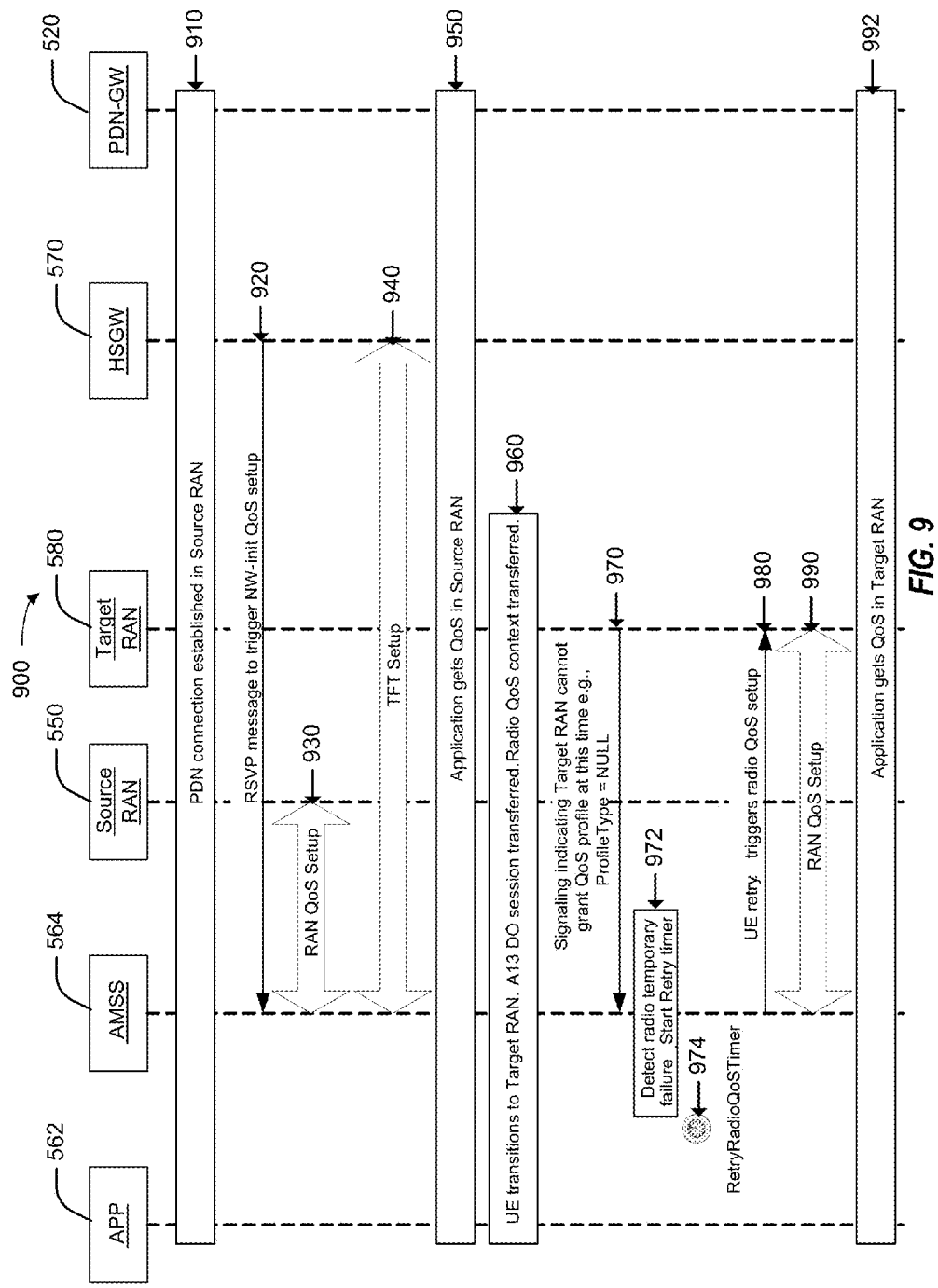
FIG. 9 is a call flow diagram illustrating a user equipment (UE) intervention for reducing a network-initiated Quality of Service (QoS) interruption time, according to a further aspect of the present disclosure.

FIG. 9 is a call flow diagram 900 illustrating a UE intervention for reducing a network-initiated QoS interruption time, according to a further aspect of the present disclosure. As shown in FIG. 9, the flows occurring at times 910 to 970 may correspond to the flows occurring at times 810 to 870 of FIG. 8. Accordingly, at time 972, the UE detects a temporary QoS failure in the target-RAN 580. At time 974, upon detecting the temporary QoS failure in the target-RAN 580, the UE 560 starts a timer. At time 980, the UE 560 reattempts a QoS setup with the target-RAN 580 after the timer expires, instead of just waiting for another trigger from the HSGW 570. Assuming a radio QoS setup was successful at time 990, the UE application 562 receives the radio QoS at time 992. If unsuccessful, the process of times 972 to 990 is repeated for a configurable number of times.

Figure 10:
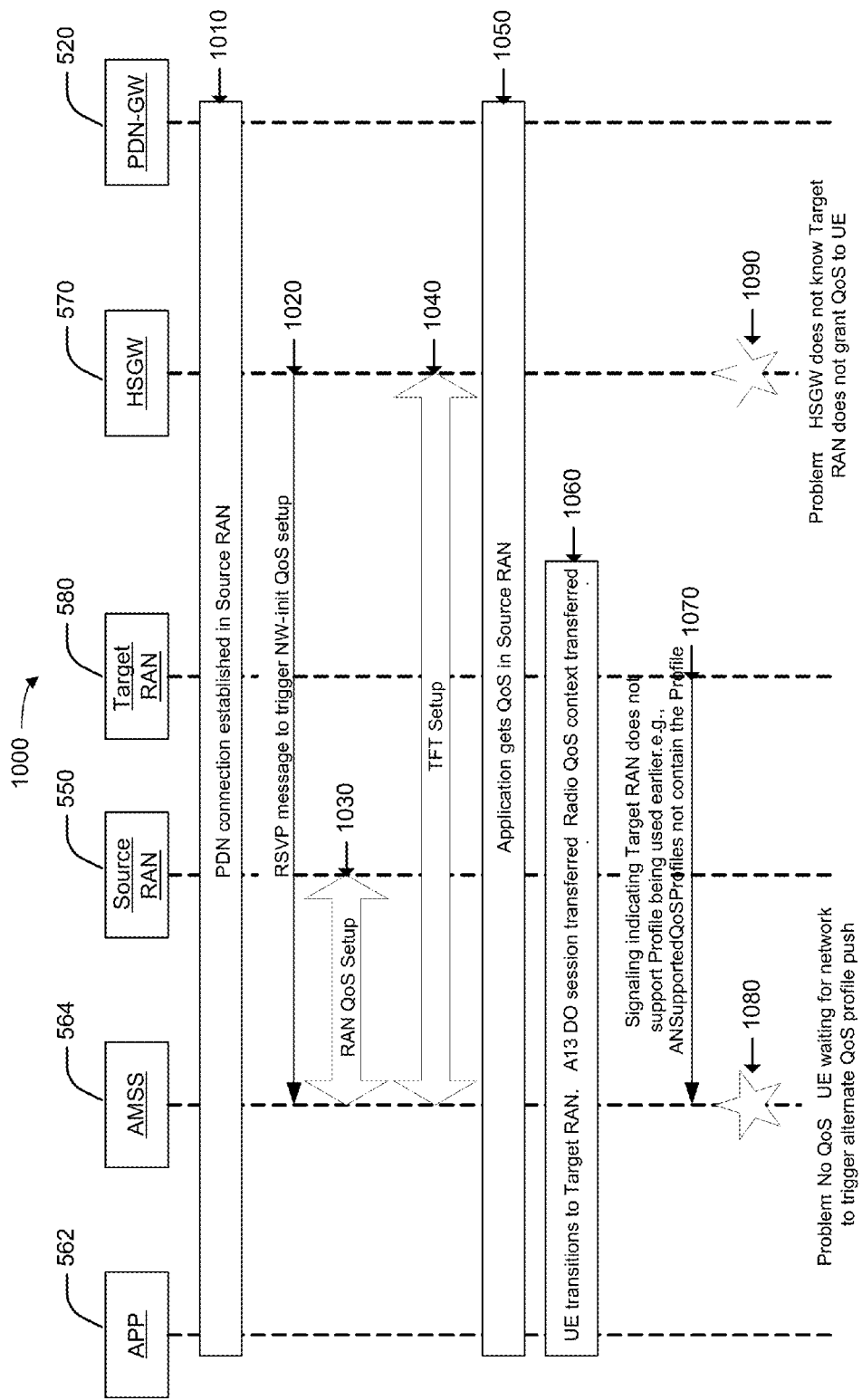
FIG. 10 is a call flow diagram illustrating an interruption of network-initiated Quality of Service (QoS) when radio and core networks are out of synchronization due to different underlying technologies.

FIG. 10 is a call flow diagram 1000 illustrating an interruption of a network-initiated QoS when the radio network and the core network are out of synchronization. As shown in FIG. 10, the flows occurring at times 1010 to 1060 may correspond to the flows occurring at times 810 to 860 of FIG. 8. Accordingly, at time 1050, the UE 560 has successfully setup radio-level and core network level QoS and the UE application 562 is receiving QoS. At time 1060, the UE 560 moves from a source RAN 550 to target-RAN 580 and an A13 interface is available to perform an EV-DO session information transfer between the RANs 550 and 580 of the QoS context from the source-RAN 550 to the target-RAN 580.

As shown in FIG. 10, at time 1070, a signal is issued indicating that the target-RAN 580 does not support the QoS profile that the UE 560 was using at the source-RAN 550. For example, the target-RAN 580 sends an updated list of ANSupportedQoSProfiles that does not contain the profile used in the source-RAN 550. At time 1080, the UE 560 remains in a passive state regarding the network-initiated QoS because the UE 560 presumes that the eHRPD network 500 will trigger the UE 560 to perform a different QoS setup. At time 1090, the HSGW 570 is unaware that the UE 560 is not receiving the network-initiated QoS. As a result, the EPC network 510 and source-RAN 550 are out of synchronization, such that the UE application 562 does not receive the network-initiated QoS.

Figure 11:
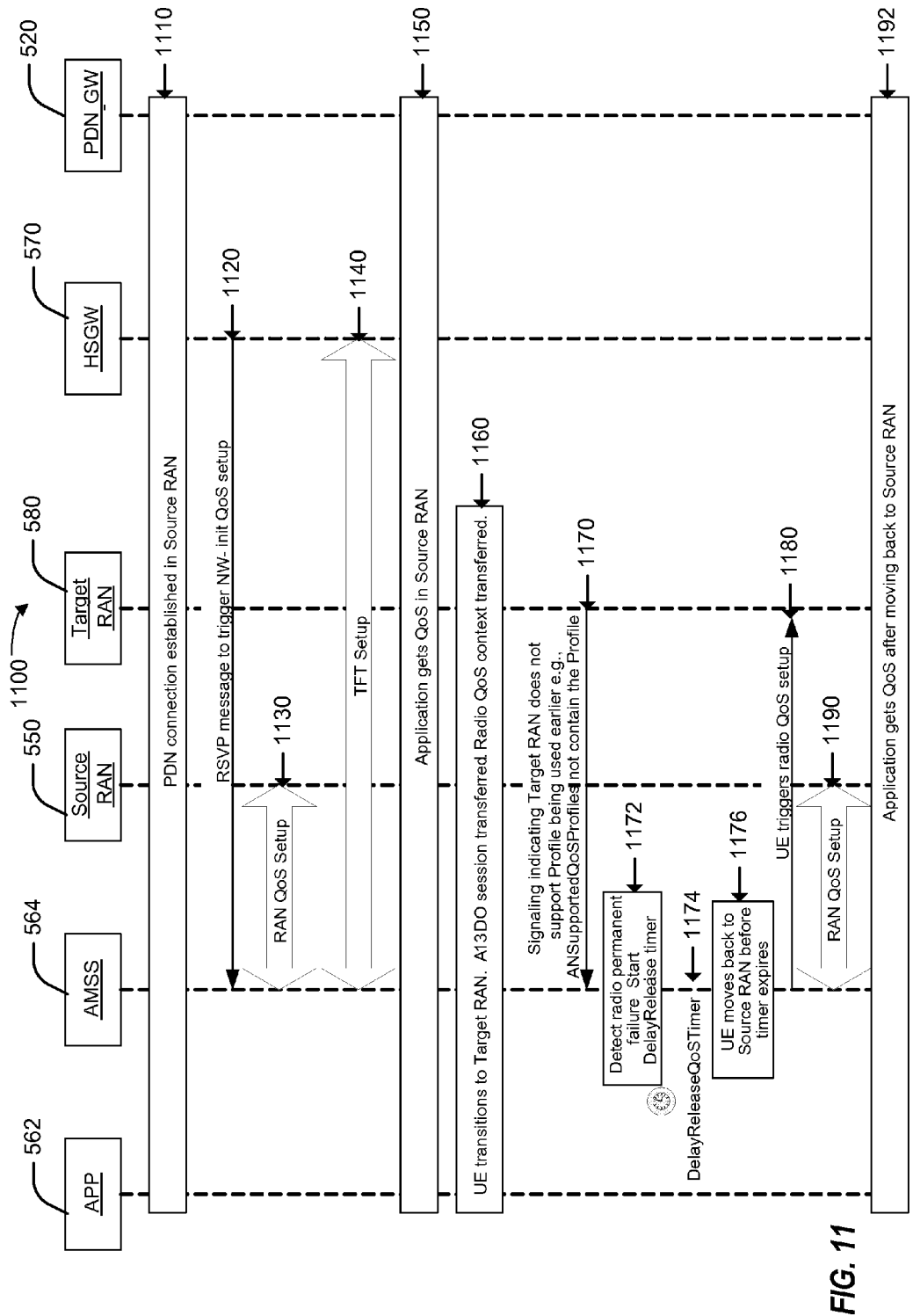
FIG. 11 is a call flow diagram illustrating a user equipment (UE) intervention for reducing a network-initiated Quality of Service (QoS) interruption time, according to a further aspect of the present disclosure.

FIG. 11 is a call flow diagram 1100 illustrating a UE intervention for reducing a network-initiated QoS interruption time, according to a further aspect of the present disclosure. As shown in FIG. 11, the flows occurring at times 1110 to 1170 may correspond to the flows occurring at times 1010 to 1070 of FIG. 10. Accordingly, at time 1172, the UE 560 detects a permanent QoS failure in the target-RAN 580. Upon detecting the permanent QoS failure in the target-RAN 580, at time 1174, the UE starts a Delay QoS Release timer. At time 1170, if the UE 560 goes back to the source-RAN 550, the network-initiated QoS is restored. In particular, the UE 560 triggers a radio QoS setup at time 1180. At time 1190 a RAN QoS setup is performed at the source-RAN 550. At time 1192, the UE application 562 receives the radio QoS.

Figure 12:
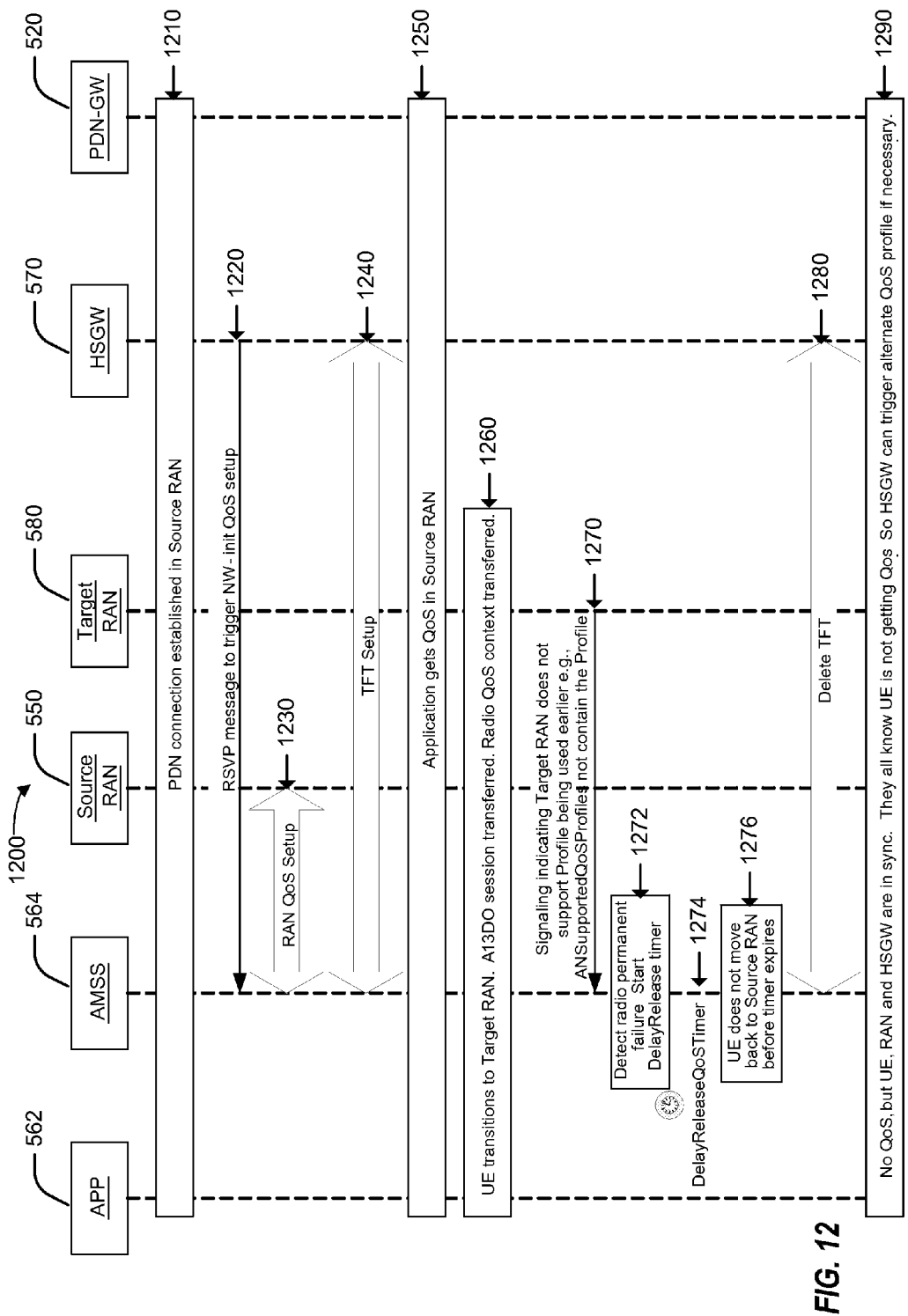
FIG. 12 is a call flow diagram illustrating a user equipment (UE) intervention for reducing a network-initiated Quality of Service (QoS) interruption time, according to an additional aspect of the present disclosure.

FIG. 12 is a call flow diagram 1200 illustrating a UE intervention for reducing a network-initiated QoS interruption time, according to an additional aspect of the present disclosure. As shown in FIG. 12, the flows occurring at times 1210 to 1274 may correspond to the flows occurring at times 1110 to 1174 of FIG. 11. Accordingly, at time 1276, if the UE 560 does not return to the source-RAN 550 before the timer expires, at time 1280 the UE 560 releases the TFT (traffic flow template) (i.e., a QoS context) at the HSGW 570. In this configuration, the release of the TFT synchronizes the EPC network 510 and the source-RAN 550 in understanding that the UE 560 is not receiving the network-initiated QoS. As a result, the EPC network 510 can push an alternate network-initiated QoS to the UE 560.

Figure 13:
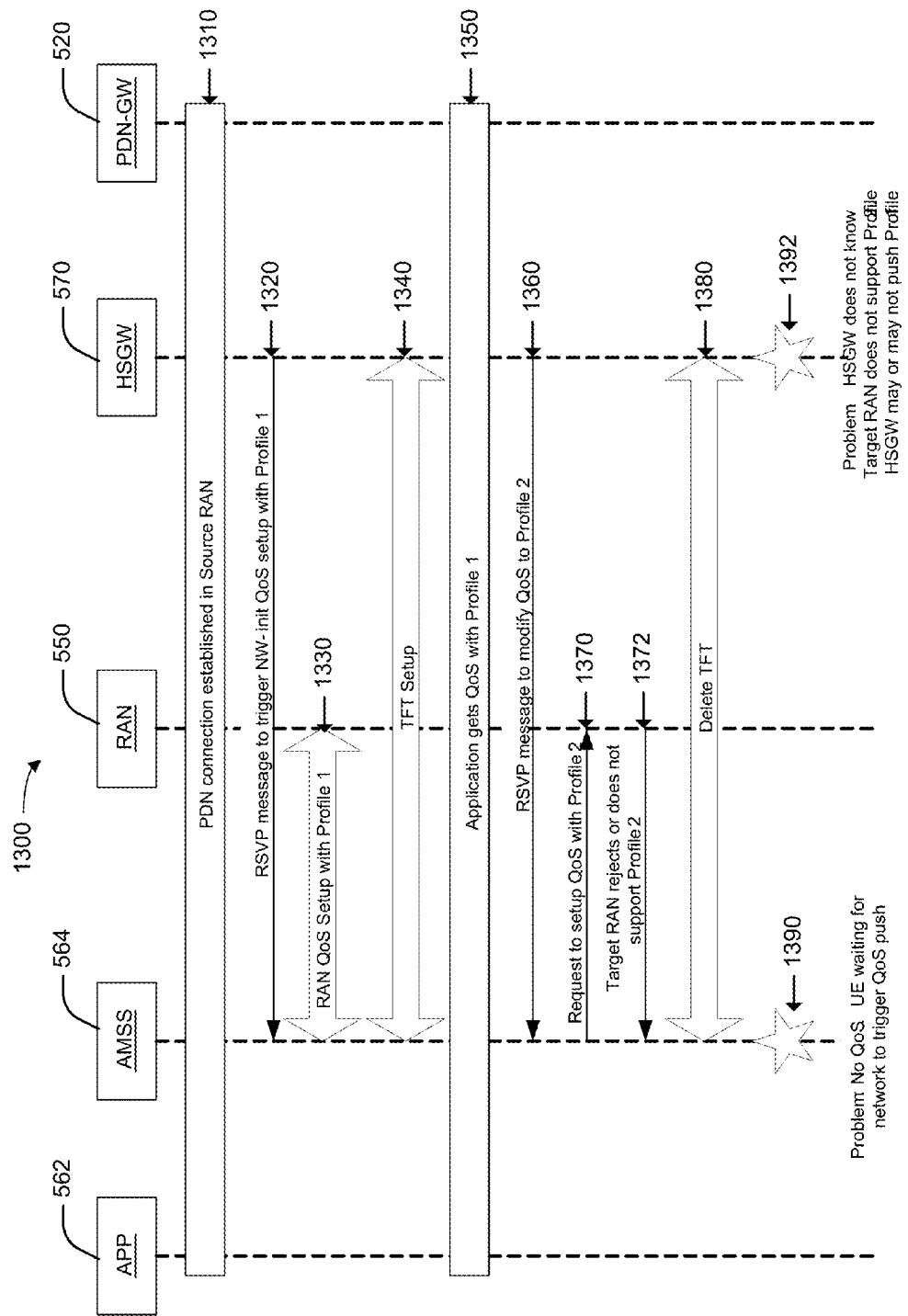
FIG. 13 is a call flow diagram illustrating an interruption of network-initiated Quality of Service (QoS) when radio and core networks are out of synchronization due to different underlying technologies.

FIG. 13 is a call flow diagram 1300 illustrating an interruption of network-initiated QoS when the radio network and the core network lose synchronization due to different underlying technologies. As shown in FIG. 13, the flows occurring at times 1310 to 1340 may correspond to the flows occurring at times 1210 to 1240 of FIG. 12. Accordingly, at time 1350, a network-initiated QoS had been triggered from the HSGW 570 and the UE 560 has successfully setup radio-level and core network level QoS. In this configuration, the UE application 562 is receiving the network-initiated QoS according to a first QoS profile.

As shown in FIG. 13, at time 1360, the HSGW 570 attempts to modify the first QoS profile of the UE 560 according to a second QoS profile. At time 1370, the AMSS 564 of the UE 560 requests the setup of QoS according to the second QoS profile. At time 1372, however, the source-RAN 550 cannot grant the second QoS profile at that time (or it does not support it at all). Thus, the UE 560 loses the existing radio-level QoS according to the first QoS profile. At time 1380, the UE 560 deletes the TFT filters at the HSGW 570. At time 1390, the HSGW 570 may or may not retrigger the network-initiated QoS according to the first QoS profile. If the HSGW 570 triggers the network-initiated QoS, the UE 560 will resume operation with network-initiated QoS according to the first QoS profile. At time 1392, a large interruption time occurs when the UE 560 is without any QoS, while the flow at time 1350 is repeated.

Figure 14:
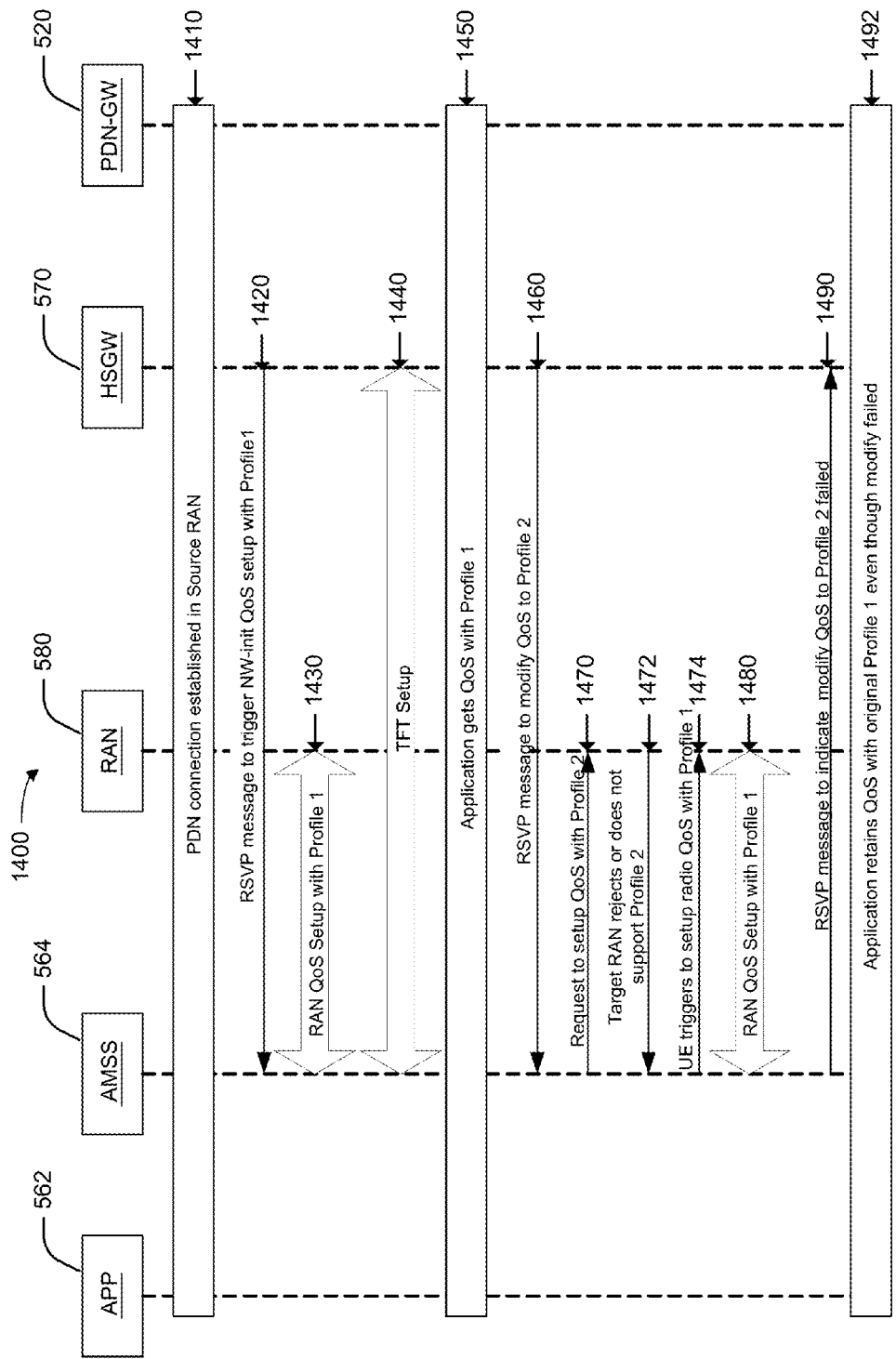
FIG. 14 is a call flow diagram illustrating a user equipment (UE) intervention for reducing a network-initiated Quality of Service (QoS) interruption time, according to another aspect of the present disclosure.

FIG. 14 is a call flow diagram 1400 illustrating a UE intervention for reducing a network-initiated QoS interruption time, according to another aspect of the present disclosure. As shown in FIG. 14, the flows occurring at times 1410 to 1472 may correspond to the flows occurring at times 1310 to 1372 of FIG. 13. Accordingly, upon receiving a failure message indicating radio QoS setup with Profile 2 at time 1472, at time 1474 the UE 560 proactively tries to restore the radio QoS according to the first QoS profile. Assuming the UE 560 succeeds in restoring the radio QoS, the HSGW 570 does not have to retrigger the network-initiated QoS to restore the first QoS profile. At time 1490, the UE 560 sends an RSVP message to indicate a failure in modification of the network-initiated QoS according to the second QoS profile. Accordingly, the UE application 562 retains the network-initiated QoS according to the first QoS profile, thereby reducing an interruption time of the network-initiated QoS or a disruption of the network-initiated QoS, while avoiding application intervention. In this configuration, if the source-RAN 550 does not support the second QoS profile 2, the UE 560 avoids modification of the radio QoS according to the second QoS profile. In another configuration, if the RAN 550 is busy, the UE application 562 can try again later.

Figure 15:
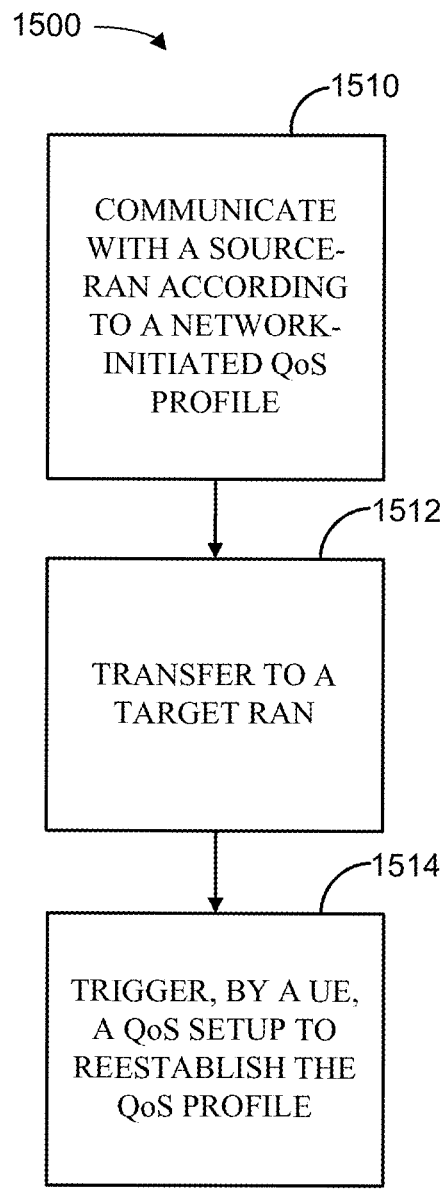
FIG. 15 is a block diagram illustrating a method for a user equipment (UE) intervention for reducing a network-initiated Quality of Service (QoS) Quality of Service (QoS) interruption time, according to one aspect of the present disclosure.

FIG. 15 illustrates a method 1500 for a UE intervention for reducing a network-initiated QoS interruption time or a disruption of the network-initiated QoS, according to another aspect of the present disclosure. In block 1510, a user equipment (UE) communicates with a source radio access network (RAN) in accordance with a network-initiated quality of service (QoS) profile. For example, a UE 560 may communicate with a source-RAN 550 according to a network-initiated QoS profile, as shown in FIGS. 8-12. In block 1512 the UE transfers to a target RAN. In block 1514, the UE triggers a QoS setup to reestablish the QoS profile.

In one configuration, the UE 120 is configured for wireless communication including means for communicating. In one aspect, the communication means may be the controller/processor 480, the memory 482, the de/modulators 454*a-t* and/or the antennas 452*a*-452*r* configured to perform the functions recited by the communication means. The UE 120 is also configured to include a means for transferring to a target RAN. In one aspect, this transfer means may be the controller/processor 480, the memory 482, the de/modulators 454*a-t* and/or the antennas 452*a*-452*r* configured to perform the functions recited by the transfer means. The UE 120 is also configured to include a means for triggering a QoS setup to reestablish the QoS profile. In one aspect, the trigger means may be the memory 482, the controller/processor 480, the de/modulators 454*a-t* and/or the antenna 452*a-t* configured to perform the functions recited by the trigger means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    communicating with a source radio access network (RAN) in accordance with a network-initiated quality of service (QoS) profile;
    moving to a target RAN;
    establishing a new session with the target RAN when the target RAN does not support a session transfer;

triggering, by a user equipment (UE), the target RAN to perform a RAN QoS setup to reestablish the network-initiated QoS profile provided to the new session with the target RAN;
receiving an indication that the target RAN cannot grant the QoS profile;
waiting a predetermined time period before triggering of the QoS setup; and
releasing, by the UE, a QoS context corresponding to the QoS profile when the UE does not return to the source RAN during the predetermined time period.

2. The method of claim 1, further comprising:
repeating the waiting and the triggering of the QoS setup after the predetermined time period a predetermined number of times in response to receiving the indication that the target RAN cannot grant the QoS profile.

3. A method of wireless communication, comprising:
communicating with a source radio access network (RAN) in accordance with a network-initiated quality of service (QoS) profile;
transferring to a target RAN;
triggering, by a user equipment (UE), the target RAN to perform a RAN QoS setup to reestablish the network-initiated QoS profile;
receiving an indication that the target RAN does not support the QoS profile;
waiting a predetermined time period;
in which the triggering the QoS setup occurs when the UE returns to the source RAN during the predetermined time period; and
deleting a QoS context when the UE does not return to the source RAN during the predetermined time period.

4. A user equipment (UE) configured for operation in a wireless communication network, the UE comprising:
a memory; and
at least one processor coupled to the memory, the at least one processor being configured:
to communicate with a source radio access network (RAN) in accordance with a network-initiated quality of service (QoS) profile;
to move to a target RAN;
to establish a new session with the target RAN when the target RAN does not support a session transfer;
to trigger the target RAN to perform a RAN QoS setup to reestablish the network-initiated QoS profile provided to the new session with the target RAN;
to receive an indication that the target RAN cannot grant the QoS profile;
to wait a predetermined time period before triggering of the QoS setup; and
to release a QoS context corresponding to the QoS profile when the UE does not return to the source RAN during the predetermined time period.

5. The UE of claim 4, in which the processor is further configured to repeat the wait and the triggering of the QoS setup after the predetermined time period a predetermined number of times in response to receiving the indication that the target RAN cannot grant the QoS profile.

6. A user equipment (UE) for operation in a wireless communication network, the UE comprising:
a memory; and
at least one processor coupled to the memory, the at least one processor being configured:
to communicate with a source radio access network (RAN) in accordance with a network-initiated quality of service (QoS) profile;
to transfer to a target RAN;
to trigger the target RAN to perform a RAN QoS setup to reestablish the network-initiated QoS profile;
to receive an indication that the target RAN does not support the QoS profile;
to wait a predetermined time period;
in which the triggering of the QoS setup occurs when the UE returns to the source RAN during the predetermined time period; and
to delete a QoS context when the UE does not return to the source RAN during the predetermined time period.

7. A computer program product configured for wireless communication in a multi-modem user equipment (UE), the computer program product comprising:
a non-transitory computer-readable medium having non-transitory program code recorded thereon, the program code comprising:
program code to communicate with a source radio access network (RAN) in accordance with a network-initiated quality of service (QoS) profile;
program code to move to a target RAN;
program code to establish a new session with the target RAN when the target RAN does not support a session transfer;
program code to trigger, by a user equipment (UE), the target RAN to perform a RAN QoS setup to reestablish the network-initiated QoS profile provided to the new session with the target RAN;
program code to receive an indication that the target RAN cannot grant the QoS profile;
program code to wait a predetermined time period before triggering of the QoS setup; and
program code to release, by the UE, a QoS context corresponding to the QoS profile when the UE does not return to the source RAN during the predetermined time period.

8. A multi-modem user equipment (UE) in a wireless communication system, the UE comprising:
means for communicating with a source radio access network (RAN) in accordance with a network-initiated quality of service (QoS) profile;
means for moving to a target RAN;
means for establishing a new session with the target RAN when the target RAN does not support a session transfer;
means for triggering the target RAN to perform a RAN QoS setup to reestablish the network-initiated QoS profile provided to the new session with the target RAN;
means for receiving an indication that the target RAN cannot grant the QoS profile;
means for waiting a predetermined time period before triggering of the QoS setup; and
means for releasing a QoS context corresponding to the QoS profile when the UE does not return to the source RAN during the predetermined time period.

9. A method of wireless communication, comprising:
communicating with a source radio access network (RAN) in accordance with a network-initiated first quality of service (QoS) profile;
receiving an indication that the source RAN does not support or cannot grant a second QoS profile;
triggering, by a user equipment (UE), the source RAN to perform a RAN QoS setup to reestablish the network-initiated first QoS profile;
waiting a predetermined time, when the indication is that the source RAN cannot grant the second QoS profile; and
retrying triggering of the RAN QoS setup.

10. A user equipment (UE) configured for operation in a wireless communication network, the UE comprising:
a memory; and
at least one processor coupled to the memory, the at least one processor being configured:
to communicate with a source radio access network (RAN) in accordance with a network-initiated first quality of service (QoS) profile;
to receive an indication that the source RAN does not support or cannot grant a second QoS profile;
to trigger the source RAN to perform a RAN QoS setup to reestablish the network-initiated first QoS profile without network intervention;
to wait a predetermined time, when the indication is that the source RAN cannot grant the second QoS profile; and
to retry triggering of the RAN QoS setup.

11. A computer program product configured for wireless communication, the computer program product comprising:
a non-transitory computer-readable medium having non-transitory program code recorded thereon, the program code comprising:
program code to communicate with a source radio access network (RAN) in accordance with a network-initiated first quality of service (QoS) profile;
program code to receive an indication that the source RAN does not support or cannot grant a second QoS profile;
program code to trigger, by a user equipment (UE), the source RAN to perform a RAN QoS setup to reestablish the network-initiated first QoS profile;
program code to wait a predetermined time, when the indication is that the source RAN cannot grant the second QoS profile; and
program code to retry triggering of the RAN QoS setup.

12. A user equipment (UE) operable in a wireless communication network, the UE comprising:
means for communicating with a source radio access network (RAN) in accordance with a network-initiated first quality of service (QoS) profile;
means for receiving an indication that the source RAN does not support or cannot grant a second QoS profile;
means for triggering the source RAN to perform a RAN QoS setup to reestablish the network-initiated first QoS profile;
means for waiting a predetermined time, when the indication is that the source RAN cannot grant the second QoS profile; and
means for retrying triggering of the RAN QoS setup.

* * * * *